Sept. 28, 1926.                     1,601,221
              H. J. MEGLEY
            TYPOGRAPHICAL MOLD
         Filed Nov. 11, 1922    5 Sheets-Sheet 1
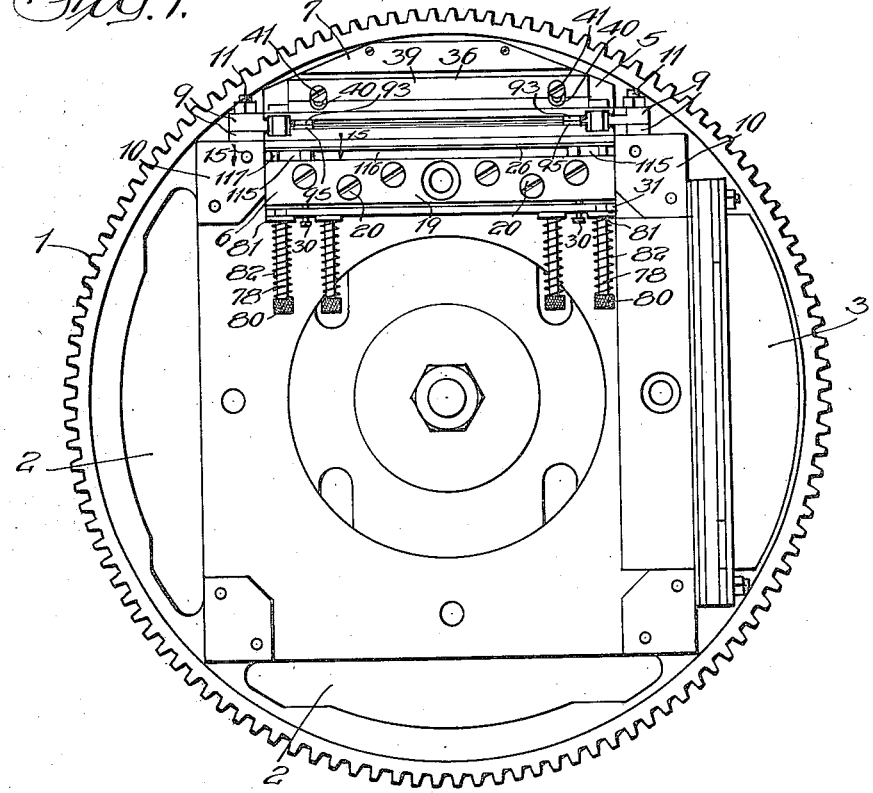
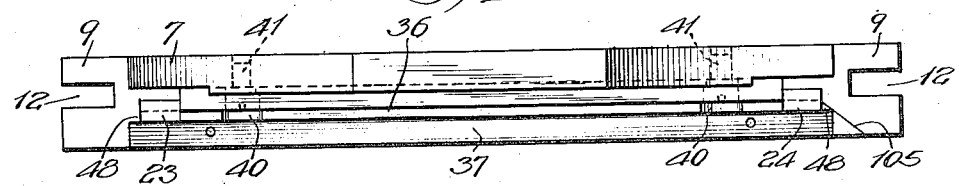

Sept. 28, 1926.

H. J. MEGLEY

TYPOGRAPHICAL MOLD

Filed Nov. 11, 1922 5 Sheets-Sheet 2

1,601,221

Witnesses:
W. F. Kilroy
Harry R. L. White

Inventor:
Harley J. Megley
By Brown, Boettcher & Dienner
Attys

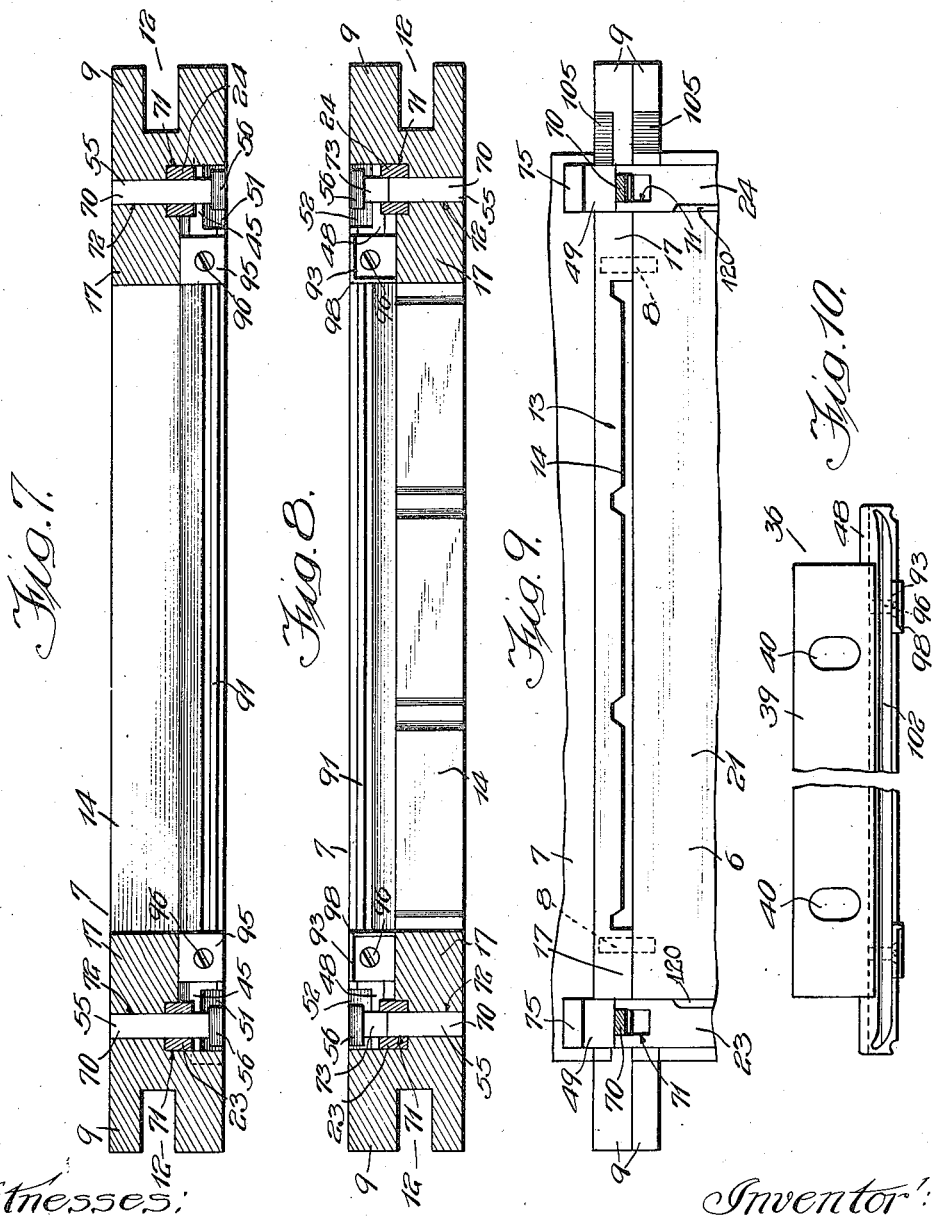

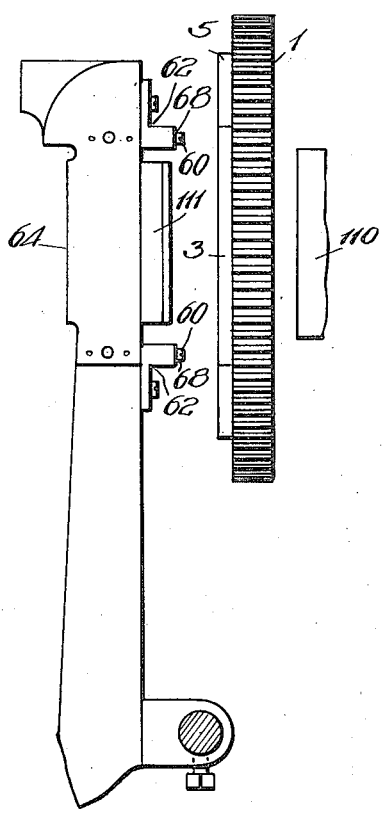
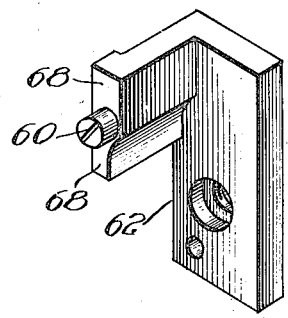
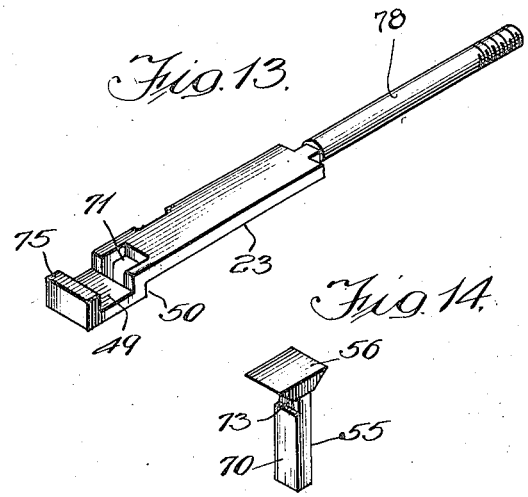
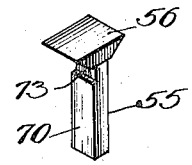
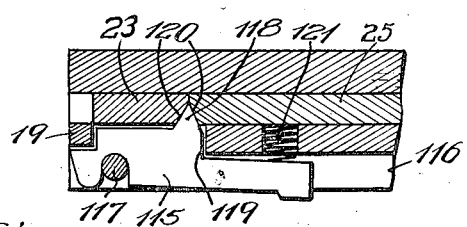

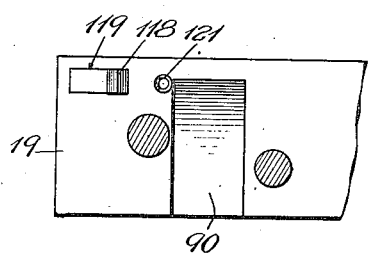
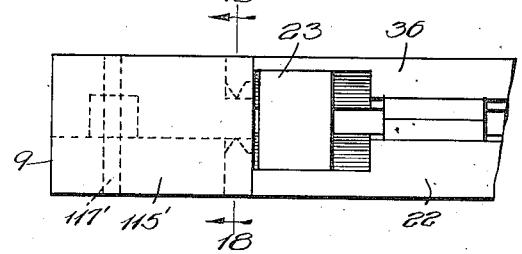
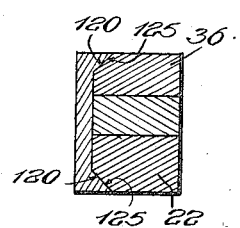
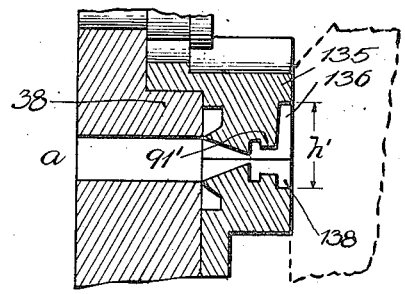
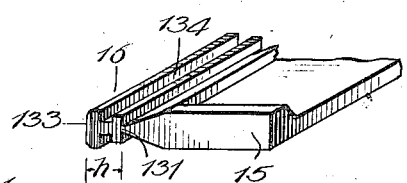
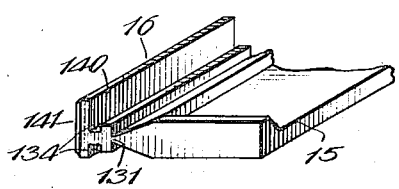

Patented Sept. 28, 1926.

1,601,221

UNITED STATES PATENT OFFICE.

HARLEY J. MEGLEY, OF CHICAGO, ILLINOIS.

TYPOGRAPHICAL MOLD.

Application filed November 11, 1922. Serial No. 600,212.

My invention relates to typographical molds and more particularly to typographical molds for making type for multigraph machines, rotary printing machines and the like.

In my copending application, Serial Number 532,656, filed January 30, 1922, I have disclosed a mold for casting an integral line of type of the desired height, and with the desired retention means for cooperation with the chases or other retention means in the cylinder or type carrier, integral with a supplemental gate through a relatively weak or fragile connecting portion, the rupture or breaking of which separates the line from the gate. The casting of the desired line ready for insertion into the grooved or chased holder of the printing machine without the performance of further operations upon it simplifies and decreases the cost of furnishing the type for a desired run on such a machine, simplifies and decreases the cost of setting up the type and using the machine and improves the results secured.

It is an object of my present invention to improve and standardize the mechanical construction, assembly and relation between the parts of such a mold;

Another object is to provide means for preventing the lodging of type metal in the mold from interfering with the functioning thereof;

Another object is the provision of means for holding the casting jaws against movement during the casting operation;

Another object is the provision of an improved arrangement for spreading or separating the mold jaws to permit ejection of the line or slug;

A further object is to provide a relatively large faced type without materially increasing the dimensions of the slug itself, and means for casting such a line or slug;

A still further object is the provision of means in the mold for adjusting the position of the matrices and thereby the positioning of the characters formed along the slug;

Further objects and advantages of my present invention will appear from the following detailed description and the claims, taken with an inspection of the accompanying drawings in which, Figure 1 is a front elevational view of the mold wheel of a type casting machine showing a mold embodying my invention in connection therewith;

Fig. 2 is a top plan view of the mold;

Fig. 7 is a longitudinal horizontal section taken on the line 7—7 of Fig. 3;

Fig. 8 is a longitudinal horizontal section taken on the line 8—8 of Fig. 3;

Fig. 9 is a fragmentary front elevational view of the mold, with the casting jaws and front base plate removed and the transversely extending stems of the spreading members in section;

Fig. 10 is an elevational view, partially broken away of the inner or rear face of the upper jaw member;

Fig. 11 is a diagrammatic side elevational view of the mold wheel and associated vice frame;

Fig. 12 is an isometric view of one of the banking blocks showing the spreader actuating means carried thereby;

Fig. 13 is an isometric view of one of the upper jaw retracting members;

Fig. 14 is an isometric view of one of the jaw spreading or separating members;

Fig. 15 is an enlarged fragmentary horizontal section taken on the line 15—15 of Fig. 1 showing one of the devices for holding the casting jaws against movement during the casting operation;

Fig. 16 is a fragmentary elevational view of one end of the inner face of the front base plate;

Fig. 17 is a fragmentary front elevational view of one end of the mold showing a modified form of device for holding the jaws against movement during the casting operation;

Fig. 18 is a vertical section taken on the line 18—18 of Fig. 17;

Fig. 19 is a fragmentary sectional view similar to Fig. 4 showing the form of upper casting jaw employed for casting a relatively large faced slug;

Fig. 20 is a fragmentary isometric view showing the line of type or slug as it is cast; and Fig. 21 is a similar view showing a slug cast with a relatively large printing or character carrying surface.

Figure 3:
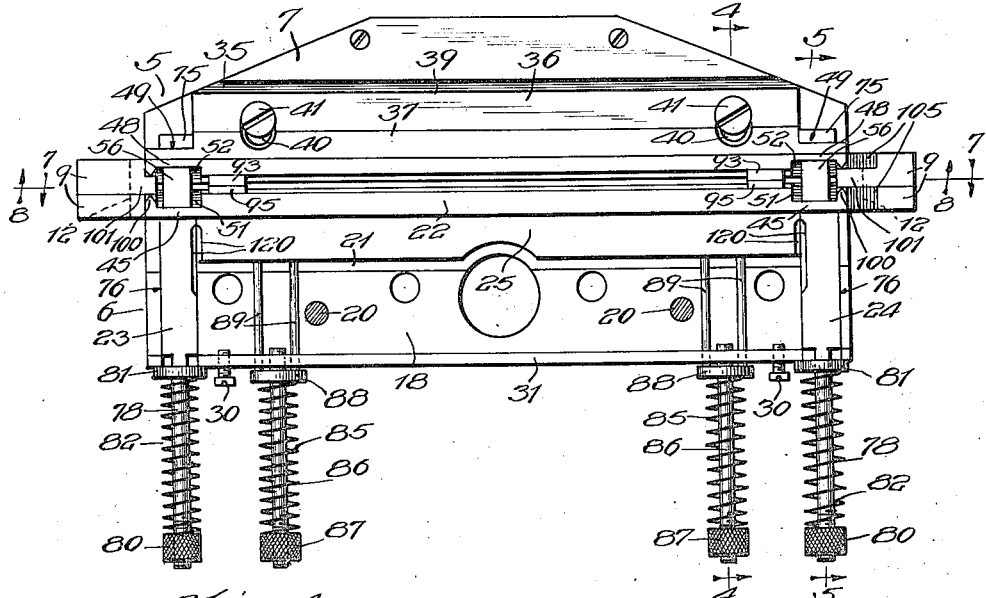
Fig. 3 is a front elevational view of the mold with the front base plate removed.

In the embodiment of the present invention which I have selected for illustration, 1 designates the mold wheel provided with openings 2 in which the molds are mounted. The wheel or mold carrier 1 which is of the usual formation is rotated and moved axially to position the molds successively for the reception of a charge of type metal and for ejection of the slug in the usual or any preferred manner which may, of course, be varied within the scope of my present invention.

For the purposes of this disclosure, I have shown one mold 5 carrying out my present invention and one mold 3 of the usual or standard formation attached to the front face of the wheel or disc 1. The molds 3 and 5 are interchangeable and it will, of course, be understood that more than one of either of said molds may be employed and that they may be attached in any desired relation or combination about the face of the mold wheel, and that the machine may be operated with molds of one form on the carrier at one time and with molds of the other form on the carrier at another time, as desired. In the particular machine shown, the type metal is squirted or run into the molds at the point in the cycle of movement in which the mold 5 is positioned in Figure 1 and ejection is effected at the point in which the mold 3 is shown. While this arrangement may also be varied, it will be apparent, as this description proceeds, that the means of my present invention is adapted to be embodied and the invention practiced with very little change in the casting machines now in general use.

The mold 5 comprises a base member 6 upon which a cap member 7 is mounted, dowel pins 8 securely holding the opposed casting faces of these mold parts in alignment. The base 6 and cap 7 are provided in the present instance with extensions 9 projecting longitudinally beyond the ends of the mold proper and the under surfaces of these extensions are properly finished to seat upon lugs or blocks 10 carried by and projecting from the face of the wheel 1, the mounting surfaces of the lugs 10 being in alignment and so positioned that when the extensions 9 rest thereupon the mold will be properly positioned on the wheel. Swiveled screws or bolts 11 pivoted in the lugs 10 are adapted to be swung into slots 12 in the opposite ends of the extensions 9 and the co-operating nuts tightened to clamp the mold securely in place. The mold 3 is similarly clamped in place as shown. The base 6 and cap 7 are held together by co-operation with the mold wheel upon mounting the mold thereupon or they may be clamped together in any suitable or preferred manner.

The inner or under surface of the cap member 7 of the mold 5 is recessed at 13 to form the space 14 in which the gate 15 of the slug line 16 (Fig. 20) is cast. The opposite ends of the casting space 14 are defined by downwardly extending portions 17 formed integral with the cap 7, and constituting in effect the spacers or liners of the mold gate. When a slug or line of different length or thickness is desired the cap 7 may be replaced with another cap with the projections 17 proportioned to give the desired thickness or length or the liners may be made in separate interchangeable pieces as well understood in the art.

The outer face of the base 6 is recessed or relieved at 18 to receive a front or outer face plate 19 which extends over the surface 18 and is secured thereto as by means of screws 20. The upper portion of the surface 18 is offset at 21 and the inner casting jaw 22 is mounted upon said surface 21 between a pair of jaw retracting members 23 and 24 with its integral depending flange 25 extending down between the surface 21 and the outer face plate 19. The ledges 26 along the upper edge of the plate 19 constitute a matrix keeper for properly positioning the line of matrices, before the mold, for the casting operation as well understood and the openings in the plate 19 through which the shanks of the screws 20 extend are sufficiently large to provide play therebetween which permits adjustment of the plate 19 and the matrix positioning ledges 26 carried thereby over the surface 21. Adjustment of the plate 19 to adjust the positioning of the matrices is accomplished by screws 30 which thread through the forwardly extending flange 31 along the lower edge of the base 6 and engage the inner or lower edge of the plate 19.

The outer face of the cap 7 is offset to provide a surface 35 upon which the outer casting jaw 36 is mounted with its lower portion offset at 37 out over the ledge 38 for movement over the outer surface of said ledge in the plane of movement of the co-operating inner jaw 22. The upwardly extending flange 39 of the jaw 36 is provided with elongated openings 40 through which the shanks of screws 41, threaded into the cap member 7, extend and serve to properly guide and maintain the positioning of the outer jaw 36. The openings 40 are countersunk to receive the heads of the screws 41, and sleeves 42 about the shanks of the screws 41, conform closely to said shanks and to the widths of the openings 40.

Figure 5:
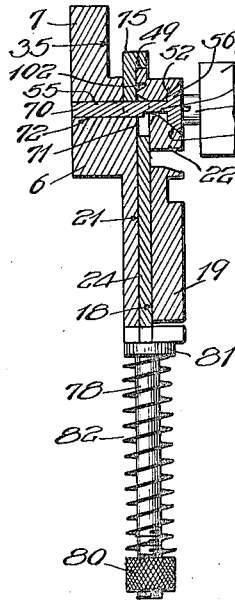
Fig. 5 is a transverse section taken substantially on the line 5—5 of Fig. 3.
Figure 6:
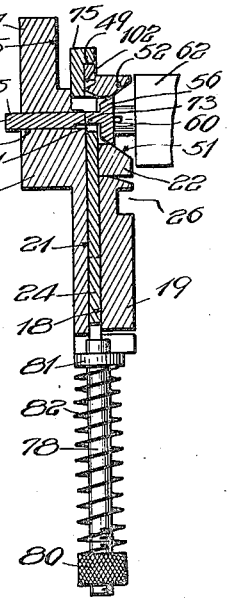
Fig. 6 is a view similar to Fig. 5 showing the casting jaws in spread relation.

The inner jaw 22 is provided with extensions 45 projecting longitudinally beyond the opposite ends of the flange portion 25 over the outer surfaces of the jaw retracting members 23 and 24. The outer jaw 36 is provided with extensions 48 projecting longitudinally beyond the opposite ends of the flange portion 39 through grooves 49 formed in the retracting members 23 and 24 by offsetting the upper ends of said members as shown at 50 in Figure 13. The opposing faces of the extensions 45 and 48 are tapered or inclined upwardly and downwardly respectively to the outer faces of the casting jaws as shown at 51 and 52 and a pair of spreading or jaw separating members 55 provided with heads 56 of wedge formation are mounted in the mold with the thicker ends of the wedge heads at the front so that when pushed rearward from their normal position as shown in Fig. 5 to the position shown in Fig. 6, they will co-operate with the tapered surfaces of the extensions 45 and 48 of the jaws 22 and 36 respectively to spread or wedge the jaw members apart and permit ejection of the type line or slug from the mold. The taper or inclination of the surfaces 51 and 52 and of the co-operating wedge heads 56 is preferably relatively great, for a purpose which will hereinafter appear.

The wedge or jaw spreading members 55 may be actuated in any suitable manner. In the present instance actuation of said members is accomplished by the heads of two screws 60 secured in banking blocks 62 carried by the vice frame 64. The heads of the screws 60 engage the outer faces of the spreading or wedge members 55 when the mold wheel is positioned with the mold in ejecting position and moved toward the frame 64 and move or push said members 55 rearwardly to spread or separate the casting jaws. The surfaces 68 of the blocks 62 form banking shoulders which finally engage the outer faces of the movable jaws to effectively brace the same during the ejecting operation. The screws 60 may be removed when the machine is to be run with the usual or ordinary molds alone or by providing slight recesses in the ordinary molds to receive the heads of said screws; removal of the screws is not necessary. Operation of one or more of the molds 5 in combination with one or more of the usual or ordinary molds or operation of a set of either type of said molds alone is thereby permitted without disturbing the mounting of the screws 60.

The stems or shanks 70 of the wedge or spreading members 55 project rearwardly through openings 71 formed in the retracting arms 23 and 24 adjacent the grooved or offset portions 50 in said arms and through openings 72 through the cap member 7. The lower or inner surfaces of the stems 70 are notched at 73, and the outer edge of the inner jaw 22 is normally projected into said notches 73 thereby preventing accidental displacement of the wedge or spreading members 55, when the mold jaws are in closed condition. When in open condition accidental displacement of the members 55 is, of course, prevented by engagement of the actuating devices 60 therewith.

The retracting arms 23 and 24, the flanges 75 at the outer ends of which engage the upper or outer surfaces of the extensions 48 of the outer jaw 36 extend over the surface 21 and through channels 76. The arms 23 and 24 are guided in the channels 76 which extend through the base 18 and flange 31. The inner ends of the arms 23 and 24 terminate in projecting stems 78 threaded to receive nuts 80 between which and washer 81, coiled springs 82 are interposed. These springs 82 yieldingly maintain the outer jaw 36 in closed position.

Figure 4:
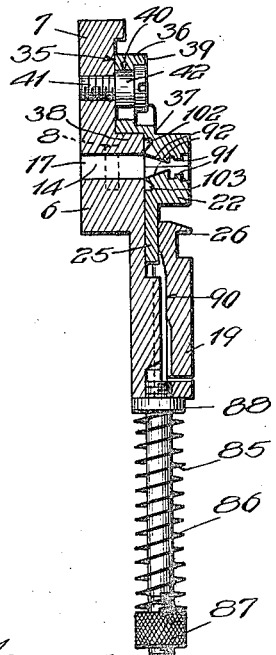
Fig. 4 is a transverse sectional view taken on line 4—4 of Fig. 3.

The inner jaw 22 is yieldingly maintained in closed position by springs 85 arranged about stems 86 threaded or otherwise fixedly secured in the inner edge of the base 6. The springs 85 are interposed between nuts 87 on the free ends of the stems 85 and washers 88 and act through said washers 88 and pins 89 upon the inner edge of the flange 25 of the inner jaw 22. The pins 89 are slidingly mounted in suitably drilled openings through the lower outstanding portion 18 and flange 31 of the mold base. To preclude possible interference with the pins 89 the adjacent portions of the inner face of the front base plate 19 are milled as shown at 90 in Figs. 4 and 16.

The opposing casting faces of the jaw members 22 and 36 are provided with longitudinally extending tongues or ridges 91 for forming the desired grooves in the opposite sides of the line portion of the slug in the casting operation. Of course, these opposing casting faces may be formed to provide any other desired retention means along the type line for mounting and holding the same in the particular multigraph, rotary press or other machine in which it is to be used. Spaced inwardly slightly from the tongues or ridges 91, the casting faces of the jaws 22 and 36 are provided with shoulders which extend into close proximity to form the bottom surface of the type line. The casting faces of the jaws are inclined or tapered from the reduced mold opening or neck thus formed to the rear faces of the jaws as shown at 92 in Fig. 4.

The opposite ends of the casting space between the jaws 22 and 36 are defined by supplemental liner pieces 93—93 and 95—95. The opposing end defining edges of each pair of these supplemental liner pieces register with the opposing end defining edges of the liner portions 17 of the cap 7. The supplemental liner pieces are secured by screws 96 to the opposed casting faces of the jaws 22 and 36.

To prevent the lodging of type metal in the mold from interfering with the proper functioning of the mold the faces of the supplemental liner pieces 93 are provided with projecting knife edges 98 along the outer and end defining edges (Figs. 8 and 10) which engage the faces of the liner pieces 95 when the mold jaws are in closed position. In case of lodging of type metal between these parts, the knife-like edges 98 cut or bite through any such lodged metal into proper engagement with the liners 95 and the proper closing of the mold is not interfered with, the recessed faces of the liners 93 receiving any metal that is spread or displaced by such cutting or biting through the same by the edges 98.

To the same end the jaw extensions 45 and 48 are provided with knife-like edges 100 for engagement with the tongue-like portion 101 of the cap 7, and the rear face of the offset portion 37 of the outer jaw 36 is grooved longitudinally as shown at 102 in Figs. 4, 5, 6 and 10 for knife edge engagement with the outer face of the ledge 38 of the cap 7. The rear face of the inner jaw 22 is grooved longitudinally as shown at 103 for knife edge engagement with the face 21 of the base 6. In that the right-hand end (Fig. 3) of the mold extends downwardly when the jaws are spaced to permit ejection and then permitted to close, I find it desirable to cut off the corners of extensions 9 adjacent the right-hand ends of the jaws 22 and 36 as shown at 105 in Figs. 2, 3 and 9, to permit any type metal loosely lodged in the mold or cut away in the closing of the jaws to drop from the mold.

In operation the mold wheel 1 is rotated to position the mold 3 for the casting operation, in this instance in the position shown in Fig. 1. At this point the type metal is squirted or run into the mold between the base and inner jaw member on one side and the cap and outer jaw on the other side. After the casting of the slug the mold wheel revolves to position the mold 3 in the position in which the mold 3 is shown in Figure 1. The axial movement at this point engages the heads of screws 60 with the wedge or spreading members 55 moving said members rearwardly and wedging the jaw members of the mold apart to permit ejection of the type line formed. When the jaws are opened the ejector blade 110 (Fig. 11) is projected into engagement with the inner edge of the gate of the slug and forces the slug out from the mold between spaced knife members 111 which trim the slug and remove any burs.

The relatively great taper of the wedge opening formed by the bevel or wedge faces of the casting jaws permits the springs 82 and 85 to close the jaws and return the spreading devices to their original position. I find in practice that there is a tendency of the casting jaws towards separation in the casting operation due to the force of the entering metal. To overcome this I provide locking means comprising a pair of arms 115—115 pivoted in the opposite ends of groove 116 extending longitudinally through the front face of the face plate 19 along the outer or upper edge thereof of (Fig. 1) upon the pins 117. The rear edges of each of the arms is provided with a wedge like portion 118 which extends through an opening 119 and the plate 19 for engagement with the opposite ends of the flange 25 of the inner jaw 22 and the adjacent edges of the outer jaw retracting members 23 and 24 which edges are all inclined or tapered as shown at 120 in Figures 3 and 15 for co-operation therewith. Coiled springs 121 mounted in openings in the rear face of the plate 19 act against flange 22 to normally relieve the engagement of the wedge protections 118 with the tapered or inclined edges 120. The free ends of the arms 115 normally project from the groove 116. Engagement with the vice jaws in the casting operation swing the arms 115 inwardly and forces the wedge projections into secure engagement with the tapered edges 120 to positively lock the jaw members 22 and 36 against movement during the casting operation.

In Figures 17 and 18 I have illustrated a modification of the means for locking the jaws against movement during the casting operation. In this case the arms 115'—115' are mounted upon the faces of extensions 9 of the base and cap of the mold which faces are recessed to receive the same for movement about the pins 117'. The free ends of the arms 115'—115' are provided with outer and inner tapered edges 120 between which correspondingly tapered edges 125 of the jaws 22 and 36 are engaged in the casting operation and the jaws thereby locked against movement. Release of this engagement may be accomplished as before by suitable springs mounted in the mold extension 9.

The finished slug is shown in Fig. 20. It comprises the type or line of type 16 the height $h$ of which is adopted for arrangement in the printing machine, joined through a reduced weakened or relatively fragile connecting portion 131 with a gate 15 which makes up the width or height which is found in the casting mechanism. The outer or upper face of the line 16 carries the printing characters or letters 133 found in the embodiment shown by running the molten metal into the desired line of matrices assembled in the vice jaws in the usual manner. The grooves or nicks 134 cast in the opposite sides of the line provide for mounting and holding the same in the multigraph machine, rotary press or the like. The casting of these may be varied, as already pointed out, according to the particular ward or mounting arrangement provided in the machine with which the type is to be used. The height $h$ of the type line from the outer face to the bottom or base may likewise be varied, as desired. The line 16 so cast is separated from its gate 15 by rupturing or breaking the relatively weak or fragile connection portion 131 upon or after ejection from the casting mechanism, giving the desired line ready for insertion into the printing machine with which it is to be used without further operations upon it.

To cast a relatively large or wide faced type, without materially increasing the dimensions of the slug itself I provide outer jaw 135 (Fig. 19) with the groove 136 along the front edge of the longitudinal tongue or ridge 91' of a width to make the casting dimension $h'$ of the jaws of the mold proper for the width of type space desired. This groove 136 is shown wider than the groove 138. That portion of the jam 36 which extends out over the ledge 38 is extended up to permit enlargement of the groove 136 to cast the relatively large printing face. Each groove may of course be enlarged equally to give the desired dimension instead of increasing the width of only one groove or the lower groove may be enlarged alone to give the desired dimension.

The slug produced with the groove 136 of increased width is shown in Figure 21 with its relatively wide flange 140 and correspondingly wide face 141. The other dimensions of the slug are not increased and the other dimensions of the mold are therefore not changed nor the operation interfered with.

Modifications and changes may of course be made within the scope of the appended claims.

I claim:—

1. In a mold for casting a slug of the class described, a body portion, a spreadable jaw portion, and means other than the slug for spreading said jaw portion without spreading said body portion, said means being carried by the mold and seated in said body portion.

2. In a mold for casting a slug of the class described, a stationary body portion constituting a mold for a portion of the opposite faces of a slug, spreadable jaw members constituting a mold for another portion of said faces and means other than the slug seated in said stationary body portion for spreading said jaw members.

3. In a mold for casting a slug of the class described, a stationary body portion constituting a mold for a portion of the opposite faces of a slug, spreadable jaw members constituting a mold for another portion of said faces, means other than the slug seated in said stationary body portion and adapted for spreading said jaw members, said means having a shank slidably mounted in the stationary body portion of the mold, and a wedge shaped head adjacent the spreadable jaw members.

4. In a mold for casting a slug of the class described, a body portion, a spreadable jaw portion, and a spreading member seated in and forming a permanent part of the mold, said spreading member being independent of the slug and having a nontapered shank slidable in the body portion of the mold, and a wedge shaped head on said shank adjacent the spreadable jaw portion.

5. The combination with a slug casting mold having means for forming retention means on the slug for securing the slug in a holder or carrier, of means other than the slug for moving said retention forming means only to release the slug, said means being mounted in the mold and permitting selective use of the mold with a mold of the usual formation.

6. In a mold for casting a slug of the class described, a body portion having a casting opening, spreadable jaw means defining a casting opening contiguous the casting opening in the body portion, said spreadable jaw means having means for forming retention means on the slug for securing the slug in a holder or carrier, and means carried by the mold and adapted for spreading said jaw means to make the jaw opening larger than the opening in the body portion of the mold to release the retention forming means without similarly increasing the opening in the body portion of the mold, said means being independent of the slug.

7. In a slug casting mold of the class described, the combination with spreadable jaw means having means for forming retention means on the slug and means carried by the mold and independent of the slug for spreading said jaw means to release the retention means, of non-spreadable means for holding the slug in position upon spreading of said jaw means.

8. The combination with a mold including spreadable jaw means of means carried by the mold for spreading said jaw means to open the mold, said jaw means engaging with said spreading means to hold the said spreading means against displacement when the mold is closed.

9. The combination with a mold including spreadable jaw means of means carried by the mold for spreading said jaw means, said jaw means holding said spreading means against displacement when the jaw means is closed, and releasing said spreading means when opened.

10. In a mold of the class described, a body portion, a pair of spreadable jaw members, means carried by the mold and adapted for spreading said jaw members, one of said jaw members projecting toward the other jaw member and into cooperation with said spreading means for holding said spreading means against displacement.

11. In a mold of the class described, a body portion, a pair of spreadable jaw members mounted for spreading movement on said body portion, a spreading member for spreading said jaw members, said spreading member comprising a non-tapered shank slidably mounted in the body portion, a wedge-shaped head adjacent the spreadable jaw members, and a recess in said shank adjacent said head, one of the spreadable jaw members engaging in said recess when said jaw members are closed to hold said spreading member against displacement.

12. The combination with a mold having spreading casting jaws, means for spreading said casting jaws, and means for closing said jaws, said jaw closing means forming the sole means for returning said spreading means to normal position.

13. In combination, a mold having spreadable casting jaws, spreading means mounted between the jaws for sliding movement at substantially right angles to the closing and opening movement of the jaws, and means for closing said casting jaws, said jaw closing means forming the sole means for returning said spreading means to normal position in the closing movement of the jaws.

14. The combination with a mold having spreadable casting jaws having inclined surfaces, of a spreading device having inclined surfaces cooperable with the inclined surfaces of said jaws and adapted for spreading said jaws, said inclined surfaces cooperating to return the spreading device to its normal position by the closing of the jaws.

15. In a mold of the class described, a pair of spreadable casting jaws, and means for spreading said jaws, said spreading means being carried by and forming a permanent part of the mold and being returned to normal position by the closing movement of the jaws.

16. The combination with a mold having spreadable jaw means, of means acting in the direction of the spreading movement of said jaw means for preventing the lodging of type metal from interfering with the relative positioning of the jaw means.

17. The combination with a mold having a pair of spreadable mold members, of means acting in the direction of the spreading movement of said spreadable mold members for dislodging type metal from between the positioning surfaces of said members.

18. In a mold of the class described, a pair of spreadable mold members defining a casting opening and having cooperating surfaces for positioning the members with respect to each other, of means for dislodging type metal from between said surfaces to permit their proper cooperation in positioning the mold members.

19. The combination with a mold having a pair of spreadable mold members, of knife means for preventing the lodging of type metal from interfering with the closing of the mold.

20. In a mold, a mold member, a second mold member having a position relative said first mold member and knife means for preventing the lodging of type metal from interfering with the relative positioning of said members.

21. In a mold, a pair of mold members having relative positions, one of said members presenting a relatively sharp edge to the other of said members to prevent the lodging of type metal from interfering with the relative positioning of said members.

22. In a mold, a mold member, a second mold member movable relative said first member, one of said mold members being grooved to present a relatively sharp edge to the other of said mold members.

23. In a mold, a mold member, a second mold member movable relative said first mold member, one of said mold members being tapered to present a relatively sharp edge to the other of said mold members.

24. In a mold, a body portion, a pair of spreadable casting jaws slidably mounted upon said body portion, said casting jaws presenting relatively sharp edges to said body portion and the body portion being recessed to permit any type metal displaced by said edges to drop from the mold.

25. The combination with a mold wheel, of a mold of the usual formation adapted for attachment to said mold wheel, a mold device having spreadable jaw means for casting a slug with retention means for securing the slug in a type holder or carrier, said second mold device being adapted for attachment to the mold wheel and for selective use with said first mold, and means for locking the spreadable jaw means of said second mold against spreading without interfering with the use of the usual mold with the wheel and without necessitating forming the second mold so that it will not be adapted for use on the wheel selectively with the usual mold.

26. The combination with a mold wheel, of a mold of the usual formation adapted for attachment to said mold wheel, a mold device having spreadable jaw means for casting a slug with retention means for securing the slug in a type holder or carrier, said second mold device being adapted for attachment to the mold wheel and interchangeable with said first mold, and means for locking the spreadable jaw means of said second mold against spreading without interfering with the use of the usual mold with the wheel and without necessitating forming the second mold so that it will not be interchangeable with the first mold.

27. The combination with a mold having jaws spreadable by motion of translation of means for locking said jaws against spreading, said means being carried by and forming a permanent part of the mold.

28. In a mold of the class described, a spreadable jaw member, means for spreading said jaw member, and a locking device pivoted adjacent the jaw member and independent of said spreading means for cooperating with the jaw member to lock it against movement.

29. In a mold, a body portion, a plate mounted on said body portion, said plate having matrix positioning means, a flange extending body portion along one edge of said plate and screw means mounted in said flange and cooperating with said plate for adjusting the position of said plate and of the matrix positioning means thereon.

30. In combination, a mold, a matrix positioning member mounted thereon, and means adjustably secured in the mold and cooperable with said matrix positioning member for adjusting the position of said member.

31. The combination with a mold wheel having mounting lugs projecting from the face thereof and a mold of the usual formation adapted for attachment to the mold wheel by clamping to said lugs of a mold having spreadable jaw means adapted for casting a slug with retention means for securing the slug in a holder or carrier, said last mold being adapted for attachment to the mold wheel interchangeably with said first mold by clamping to said lugs.

32. The combination with a mold wheel having mounting lugs projecting from the face thereof, and a mold of the usual formation adapted for attachment to the mold wheel by clamping to said lugs of a mold having spreadable jaw means adapted for casting a slug with retention means for securing the slug in a holder or carrier, said second mold being adapted for attachment to the mold wheel by clamping to said lugs and for selective use with said first mold.

33. The combination with a mold wheel having mounting lugs projecting from the face thereof, of a mold having spreadable jaw means adapted for casting a slug with retention means for securing the slug in a holder or carrier, said mold having extension projecting longitudinally beyond the opposite ends thereof, said projections being slotted and screws carried by the lugs on the mold wheel and engageable in said slotted extensions to clamp the mold to the wheel.

34. In a mold, the combination of a pair of spreadable jaw members, an arm normally holding one of said members in closed position and extending along the other of said jaw members, said other jaw member and said arm having adjacent beveled edges, a face plate extending over said edges, and a locking device pivoted in said face plate and provided with a tapered projection engageable with said adjacent beveled edges to lock the jaw members against movement.

35. In a mold, the combination of a body portion, a casting jaw, a pin slidably mounted in the body portion, a stem secured in said body portion and projecting therefrom, said stem having a head, and a spring interposed between the slidable pin and said head and acting on said mold through said pin.

36. The combination of a mold having spreadable jaw members for casting a slug with retention means for securing the slug in a holder or carrier of liner means varied by and movable with one of said mold members, and liner means carried by and movable with the other mold member and cooperable with said first liner means.

37. In a mold, a body portion, a face plate, said body portion being offset to receive said plate and provide a projecting flange and an adjusting screw mounted in said flange and engageable with said plate for adjusting the same over said offset surface.

38. In a mold the combination of a jaw portion, means for opening said jaw portion, said opening means being automatically returned to its original position solely by the closing of said jaw portion.

39. In a mold, liner means having a relatively sharp edge for preventing the lodging of type metal from interfering with the operation of the mold.

40. The combination with a matrix having a casting face of mold means defining a casting opening adjacent said face, said mold means having means for forming a slug with a relatively wide head overhanging one side only of the slug and providing a relatively wide printing face and means adjacent said head forming means for forming mounting means in the slug adjacent said head, and a separable gate with means for forming a separable connection between the gate and head.

41. The combination with a matrix having a casting face of mold means defining a casting opening adjacent said face, said mold means including a pair of spreadable jaw members, one of said spreadable jaw members having a relatively wide casting groove at the end of the casting space defined by the mold, said groove forming a slug with a relatively wide head overhanging one side only of the slug and providing a relatively wide printing face and means adjacent said head forming means for forming mounting means in the slug adjacent said head, and a separable gate with means for forming a separable connection between the gate and head.

42. The combination with a matrix having a casting face of mold means defining a casting opening adjacent said face, said mold means having spreadable jaw members for forming retention means on the slug adjacent the casting opening and a separable gate with means adjacent the retention forming means for forming a separable connection between said gate and said head, one of said jaw members having means for forming the slug with a relatively wide head overhanging one side only of the slug and providing a relatively wide printing face.

43. The combination with a mold having spreadable jaw means for forming a slug with retention means for securing same in a holder or carrier and with a removable gate of means for forming a recess and ribs on said gate, on said gate only.

44. The combination with a mold having spreadable jaw means for forming a slug with retention means for securing same in a holder or carrier and a stationary body portion for forming a removable gate on the slug, of means on the stationary body portion for forming a recess, and ribs on said gate, only.

45. The combination with a matrix having a casting face of mold means defining a casting opening adjacent said faces, said mold means having jaw members spreadable by motion of translation and having casting faces for casting sides of the slug, and one of said jaw members having a relatively wide recess for casting a wide overhanging head on the slug outwardly beyond the sides cast by said casting faces.

In witness whereof, I hereunto subscribe my name this 8 day of November, 1922.

HARLEY J. MEGLEY.